United States Patent
Zhao et al.

(10) Patent No.: US 10,240,059 B2
(45) Date of Patent: Mar. 26, 2019

(54) CATIONIC LATEX FIXATIVE FOR INK APPLICATIONS

(71) Applicant: Hewlett-Packard Development Company, L.P., Houston, TX (US)

(72) Inventors: Yan Zhao, Palo Alto, CA (US); Howard S. Tom, San Jose, CA (US); Hou T. Ng, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 15/039,816

(22) PCT Filed: Dec. 6, 2013

(86) PCT No.: PCT/US2013/073584
§ 371 (c)(1),
(2) Date: May 26, 2016

(87) PCT Pub. No.: WO2015/084395
PCT Pub. Date: Jun. 11, 2015

(65) Prior Publication Data
US 2017/0029647 A1    Feb. 2, 2017

(51) Int. Cl.
| | |
|---|---|
| *C09D 11/54* | (2014.01) |
| *B41M 5/00* | (2006.01) |
| *B41M 7/00* | (2006.01) |
| *C09D 133/26* | (2006.01) |
| *C08F 2/22* | (2006.01) |
| *B41J 2/01* | (2006.01) |
| *C09D 11/107* | (2014.01) |
| *C09D 133/08* | (2006.01) |
| *C08F 220/18* | (2006.01) |

(52) U.S. Cl.
CPC .............. *C09D 11/54* (2013.01); *B41J 2/01* (2013.01); *B41M 5/0017* (2013.01); *B41M 7/0018* (2013.01); *C08F 2/22* (2013.01); *C09D 11/107* (2013.01); *C09D 133/08* (2013.01); *C09D 133/26* (2013.01); *C08F 220/18* (2013.01)

(58) Field of Classification Search
CPC ........................................ C09D 11/54
USPC ............................................. 347/20
See application file for complete search history.

(56) References Cited

U.S. PATENT DOCUMENTS

| | | | |
|---|---|---|---|
| 6,232,395 B1 * | 5/2001 | Sun ...................... | B41M 5/0011 524/441 |
| 6,471,757 B1 | 10/2002 | Koitabashi et al. | |
| 6,669,815 B1 | 12/2003 | Sugiyama et al. | |
| 7,253,216 B2 | 8/2007 | Miyabayashi | |
| 7,425,062 B2 | 9/2008 | Bauer | |
| 8,202,585 B2 | 6/2012 | Schultz et al. | |
| 2002/0149662 A1 | 10/2002 | Lawrence et al. | |
| 2002/0176966 A1 * | 11/2002 | Missell ................ | B41M 5/5254 428/32.34 |
| 2002/0192438 A1 | 12/2002 | Hutter et al. | |
| 2006/0106137 A1 | 5/2006 | Kubota et al. | |
| 2006/0137574 A1 | 6/2006 | Preston et al. | |

FOREIGN PATENT DOCUMENTS

| | | |
|---|---|---|
| EP | 1241193 | 9/2002 |
| EP | 1878588 | 1/2008 |
| GB | 2341122 | 3/2000 |
| JP | 2000265380 | 9/2000 |
| JP | 2002274025 | 9/2002 |
| KR | 1020060041247 | 5/2006 |

OTHER PUBLICATIONS

International Search Report and Written Opinion for International Application No. PCT/US2013/073584 dated Sep. 5, 2014, 12 pages.
The Extended European Search Report for International Application No. PCT/US2013/073584 dated Aug. 26, 2016, 7 pages.

\* cited by examiner

*Primary Examiner* — Doris L Lee
(74) *Attorney, Agent, or Firm* — Dierker & Kavanaugh PC

(57) ABSTRACT

A cationic latex fixative for ink applications is provided. The cationic latex fixative derived from a combination of a cationic monomer, a nonionic monomer that provides softness to the latex, and a nonionic monomer that provide stiffness to the latex. A method of manufacturing the fixative and a method of printing the fixative are also provided.

16 Claims, 3 Drawing Sheets

CATIONIC LATEX FIXATIVE FOR INK APPLICATIONS

BACKGROUND

There are several reasons that inkjet printing has become a popular way of recording images on various media surfaces, particularly paper. Some of the reasons include low printer noise, capability of high-speed recording, and multi-color recording. Additionally, these advantages can be obtained at a relatively low price to consumers. However, although there has been great improvement in inkjet printing, accompanying this improvement are increased demands by consumers in this area, e.g., higher speeds, higher resolution, full color image formation, increased stability, more permanent images, etc.

In general, inkjet inks are either dye- or pigment-based inks. Both are typically prepared in a liquid vehicle that contains the dye and/or the pigment. Dye-based inkjet inks have been a dominant technology in the inkjet ink arena. However, as many dyes are water-soluble, images printed using many of such dye-based ink jet inks are not as water-fast as may be desirable. The water-fastness of an anionic dye-based inkjet ink printed on media has been shown to be enhanced by overprinting or underprinting the printed image with a fixer fluid including cationic material. Thus, when the cationic polymer and the anionic dye contact one another on a substrate, a reaction between the dye and the cationic material creates an image with improved water-fastness and permanence.

The most widely used cationic fixative in inkjet receptive coatings is poly(diallyldimethylammonium chloride), although other water-soluble cationic polymers are known, such as poly(vinylbenzylquaternary ammonium salts. Other examples include using calcium chloride as the fixing agent. For some of the solutions, a binder (coming from the ink dispersions) is typically required to improve the overall print durability.

DETAILED DESCRIPTION

Figure 1:
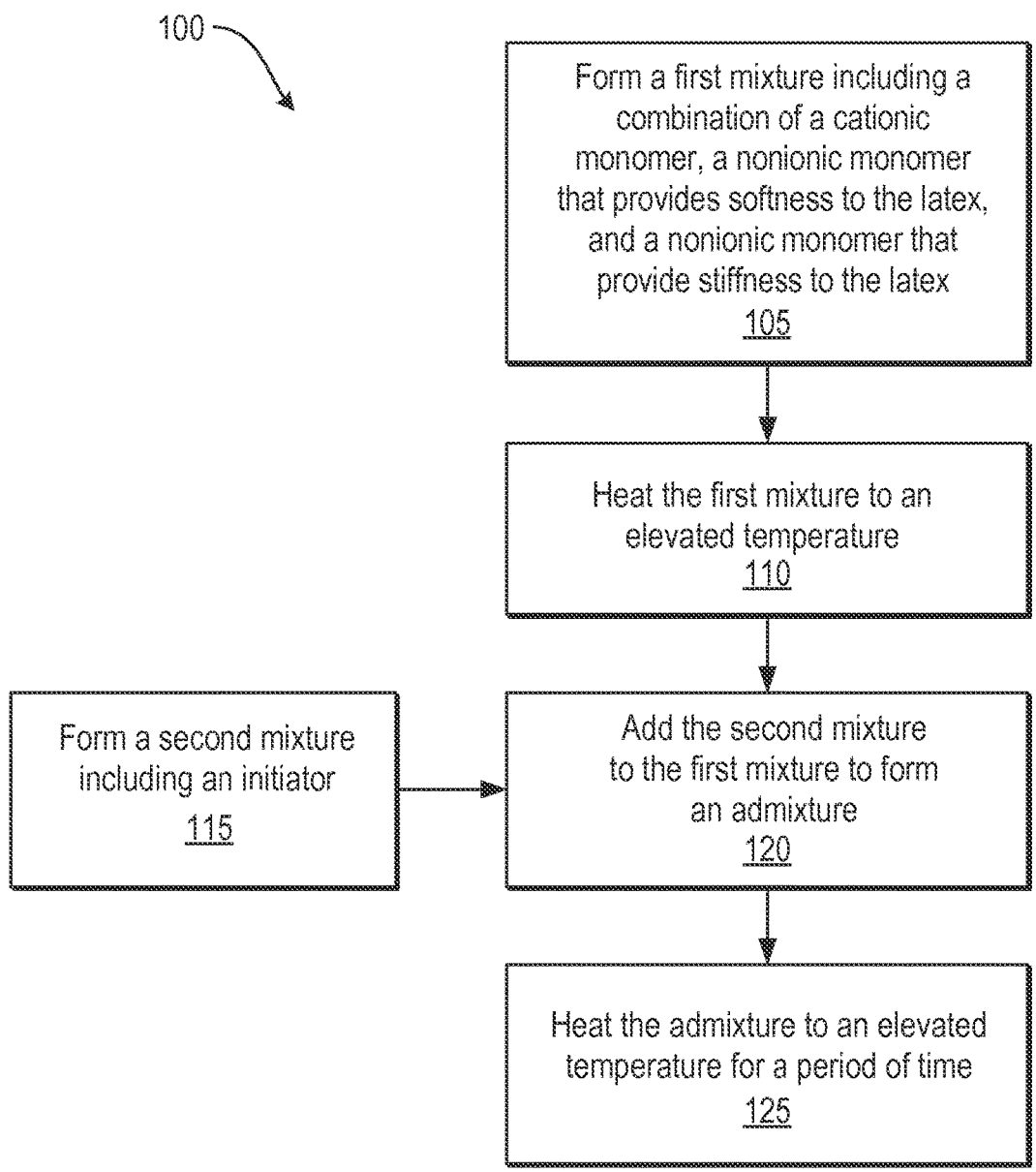
FIG. 1 is a process flow chart, showing a method for manufacturing a cationic latex fixative, in accordance with an example.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

It is be noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint, and may be related to manufacturing tolerances. The degree of flexibility of this term can be dictated by the particular variable and would be within the knowledge of those skilled in the art to determine based on experience and the associated description herein. In some examples, "about" may refer to a difference of ±10%.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1 to 3, from 2 to 4, and from 3 to 5, etc. This same principle applies to ranges reciting only one numerical value. Furthermore, such an interpretation should apply regardless of the breadth of the range or the characteristics being described.

Most of the latexes used in inkjet printing are anionic emulsions that contain a substantial amount of an acidic monomer (such as methacrylic acid). The acidic functionality of the polymer is subsequently neutralized via the employment of a base. This greatly enhances the hydrophilicity of the latex particles, and gives negatively charged latex particles.

For the inkjet printing, the receptive coating on the substrates (for example, paper) has traditionally been formulated with hydrophilic materials such as polyvinyl alcohol (PVOH). However, a problem may exist with the use of PVOH in that PVOH has no anionic latex trapping properties. In order to obtain highquality prints with high color density, the ink particles must be immobilized almost immediately upon contact of the ink with the substrate. Penetration of the ink particles into the substrate may result in reduced optical color density. The wicking of ink drops may typically lead to bleeding, and hence poor image acuity.

In accordance with the teachings herein, a cationic acrylic latex for inkjet applications is provided. More particularly, cationic acrylic emulsion latexes may be used to enhance the ink fixing for both contented and un-contented ink dispersions. By "contented" ink dispersions is meant ink dispersions containing a binder. By "un-contented" ink dispersions is meant ink dispersions not containing a binder. The cationic latexes fixative may suppress the ink penetration and/or coalescence/bleeding due to migration of ink particles.

The cationic latexes for ink jet printing may eliminate many of the problems involved in using anionic or nonionic polymers. More specifically, the cationic latexes may serve as (1) an intermediate receiving medium between the ink colorants and the substrates; and (2) as a medium to crash and fix negatively charged colorants from both contented and un-contented ink dispersions. The latter is particularly important since it may allow potentially lower cost simpler pigment-based dispersions to be used while still delivering the desired print durability and quality.

The composition of the cationic latexes may be derived from:

1 to 80.1 weight percent of one or more cationic monomers;

0.9 to 50.5 weight percent of one or more nonionic monomers, providing softness to latex; and 0 to 40.5 weight percent of one or more nonionic monomers, providing stiffness to latex. The final cationic latex after polymerization may have a composition similar to that of the starting components.

Examples of cationic monomers include, but are not limited to, 2-(methacryloyloxy)ethyl trimethylammonium chloride, dimethylaminoethyl acrylate methyl chloride, dimethylaminoethyl methacrylate methyl chloride quaternary salt, acrylamidopropyltrimethylammonium chloride, [2-(acryloyloxy)ethyl](4-benzoylbenzyl)dimethylammonium bromide, methacrylamidopropyltrimethylammonium chloride, diallyldimethylammonium chloride, 4-vinyl pyridine, 2,6-diethyl-4-vinyl pyridine, 3-dodecyl-4-vinyl pyridine, and 2,3,5,6,-tetramethyl-4-vinyl pyridine.

Examples of nonionic monomers that provide softness include, but are not limited to, butyl acrylate, hexyl acrylate, 2-ethyl hexyl acrylate, octyl acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate, where the term "(meth)acrylate" is intended to include both the acrylate and the methacrylate, as is well-known. By "softness" is meant that the polymer made from the monomer has a glass transition temperature $T_g$ of less than room temperature.

Examples of nonionic monomers that provide stiffness include, but are not limited to, styrene, acrylonitrile, methyl methacrylate, alpha-methyl styrene, vinyl toluene, and vinyl naphthalene. By "stiffness" is meant that the polymer made from the monomer has a glass transition temperature $T_g$ of greater than about 50° C.

The polymerization may be initiated by employing a water-soluble initiator in the presence of a cationic emulsifier.

Examples of water-soluble initiators include, but are not limited to, $K_2S_2O_8$, 2,2'-azobis(2-methylpropionamidine) dihydrochloride (V-50), 2,2'-azobis(isobutyramidine) dihydrochloride, 2,2'-azobis[2-methyl-N-(2-hydroxyethyl) propionamide], 2,2'-azobis{2-[1-(2-hydroxyethyl)-2-imidazolin-2-yl]propane}dihydrochloride, 2,2'-azobis(1-imino-1-pyrrolidino-2-ethylpropane)dihydrochloride, 2,2'-azobis[2-(2-imidazolin-2-yl)propane]disulfate dihydrate, 2,2'-azobis[2-(2-imidazolin-2-yl)propane]dihydrochloride, and 2,2'-azobis[N-(2-carboxyethyl)-2-methylpropionamidine] hydrate].

Examples of cationic emulsifiers include, but are not limited to, didodecyldimethylammonium bromide (DDAB) or dodecyl trimethylammonium bromide (DTAB), dimethyldioctadecylammonium bromide, dodecyldimethylethylammonium bromide, tetradecyltrimethylammonium bromide, laurylamine oxide, lauryl dimethylamine oxide, and N,N-dimethyldodecylamine-N-oxide.

A first mixture ("Mixture A") may be formed by combining the monomers (e.g., butyl acrylate, styrene, and the cationic monomers) with the emulsifier (e.g., DDAB) and water in a reactor. The temperature of the reactor may be increased until the temperature of Mixture A reaches about 60° C. A second mixture ("Mixture B") may be formed by combining the initiator (e.g., V-50) and water. Once the temperature of Mixture A has reached about 60° C., then Mixture B may be charged dropwise into the reactor over a period of about 1 to 2 hours to form an admixture. If Mixture B is added too fast, then the reaction could cause cross-linking or form a gel. After Mixture B is completely added to the reactor, the reaction temperature of the admixture may be maintained within a range of about 60° to 80° C. for a period of time about 3 to 10 hours to finish the polymerization. The initiator may need an elevated temperature to initiate the reaction, and a temperature of at least about 60° C. appears to accomplish this. In general, lower temperatures may take a longer time to complete the reaction, while higher temperatures may take a shorter time to complete the reaction.

FIG. 1 depicts an example method 100 for manufacturing the cationic latex fixative, in accordance with the teachings herein. The method includes forming 105 a first mixture including the monomers. The method further includes heating 110 the first mixture to an elevated temperature. The method additionally includes forming 115 a second mixture including an initiator. The method further includes adding 120 the second mixture dropwise to the first mixture to form an admixture. The method additional includes heating 125 the admixture to an elevated temperature for a period of time to finish the cationic emulsion polymerization.

The cationic latex fixative can be jetted on a print medium by using a printer, or it can be applied to the medium by roller coating or any technology in the coating and painting industry. In some examples, in order to achieve good fixation of ink particles, the cationic latex fixative may be applied prior to ink printing.

Figure 2:
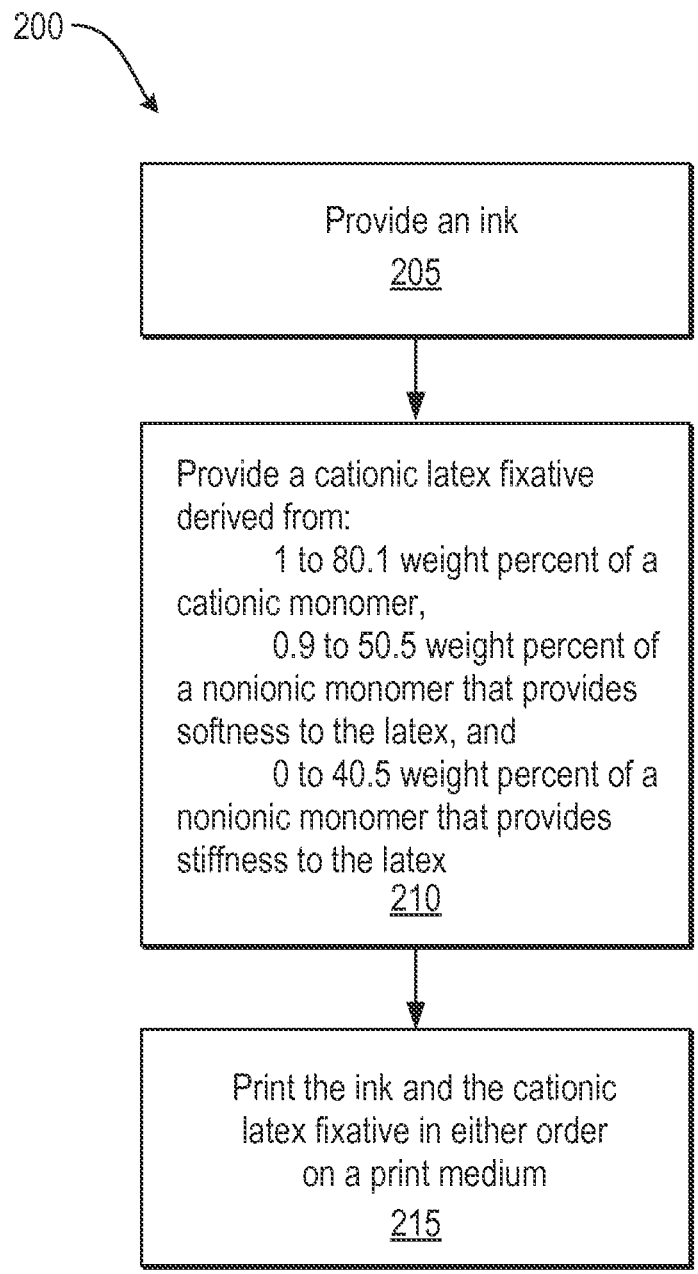
FIG. 2 is a process flow chart, showing a method of printing using a cationic latex fixative, in accordance with an example.

FIG. 2 depicts an example method 200 of printing/fixing an ink on a print medium, in accordance with the teachings herein. The method includes providing 205 an ink. The method further includes providing the cationic latex fixative, as described above. The method additionally includes printing 215 the ink and the cationic latex fixative in either order on the print medium. As noted above, in some examples, the cationic latex fixative may be printed first, prior to ink printing.

EXAMPLES

Cationic acrylic latexes were prepared as follows. Polymerizations were carried out in a 250-mL flask equipped with stirrer, reflux condenser, and inlet system for initiator (the reactor). Copolymer emulsions were prepared in a batch process using the recipes given in Table I, below. All reactants and water, except for the initiator, were charged into the reactor. The polymerization temperature was controlled at 65° C. by using a heating mantle. As the temperature of the flask approached 65° C., the initiator in aqueous solution was charged dropwise into the reactor.

TABLE I

Formulations of the Cationic Latex

| | Formulations | | | |
|---|---|---|---|---|
| Ingredients | A | B | C | D |
| Monomers: | | | | |
| Butyl acrylate | 14.93 | 15.38 | 11.93 | 12.39 |
| Styrene | 4.64 | 3.91 | 5.26 | 3.57 |
| 2-(methacryloyloxy)ethyl trimethylammonium chloride[a] | | 5.12 | 9.05 | 5.74 |
| [2-(acryloyloxy)ethyl](4-benzoylbenzyl)-dimethylammonium bromide[b] | | 1.26 | | 4.29 |

TABLE I-continued

Formulations of the Cationic Latex

| Ingredients | Formulations | | | |
|---|---|---|---|---|
| | A | B | C | D |
| Emulsifier: | | | | |
| DDAB | 1.02 | 0.80 | 0.93 | 1.02 |
| Initiator: | | | | |
| V-50[c] | | 0.56 | 0.73 | 0.80 |
| $K_2S_2O_8$ | 0.52 | | | |
| Media: | | | | |
| Water | 65.00 | 62.85 | 57.91 | 83.77 |
| Emulsion stability | Poor[d] | Good | Poor[d] | Excellent |
| Particle Size (nm) | | 294 | | 185 |

Notes:
[a] 2-(methacryloyloxy)ethyl trimethylammonium chloride is a cationic monomer, available from Sigma-Aldrich as 408107 Aldrich.
[b] [2-(acryloyloxy)ethyl](4-benzoylbenzyl)dimethylammonium bromide is a cationic monomer, available from Sigma-Aldrich as 406325 Aldrich.
[c] V-50, also known as 2,2'-azobis(2-methylpropionamidine) dihydrochloride, is a cationic initiator, available from Sigma-Aldrich as 440914 Aldrich.
[d] Poor: emulsion crashed during the copolymerization reaction.

As shown in Table I, Formulation A gave an emulsion of poor stability, and the emulsion crashed during the synthesis. There are two shortcomings of the formulation A. First, Formulation A did not have cationic monomers, and the whole emulsion system was stabilized by DDAB. DDAB, by its own, cannot provide enough stabilization for the whole emulsion system. Second, the initiator $K_2S_2O_8$ may not be a good one for cationic emulsion copolymerization, because it decomposes into anionic species, which may impart anionic functional groups in the copolymer chain, which may cause stability issues. Nevertheless, $K_2S_2O_8$ may be useful in some cases.

The initiator was then changed to a cationic one, V-50, in Formulation B. Furthermore, two cationic monomers were used, namely, 2-(methacryloyloxy)ethyl trimethylammonium chloride and [2-(acryloyloxy)ethyl](4-benzoylbenzyl) dimethylammonium bromide. These cationic monomers can impart some cationic charges in the copolymer chains, which can provide electrostatic stabilization for the emulsion particles.

Among the two cationic monomers, 2-(acryloyloxy)ethyl] (4-benzoylbenzyl) dimethylammonium bromide may be more important for the stabilization of the emulsion. When it is not used (as in Formulation C), the emulsion system became very unstable, and crashed during copolymerization. When its amount was increased in the formulation (as in Formulation D), the emulsion had an excellent stability, and the particle size decreased from 294 nm (Formulation B) to 185 nm (Formulation D). The particle size distributions are shown in FIG. 3A (Formulation C) and FIG. 3B (Formulation D).

Figure 3A:
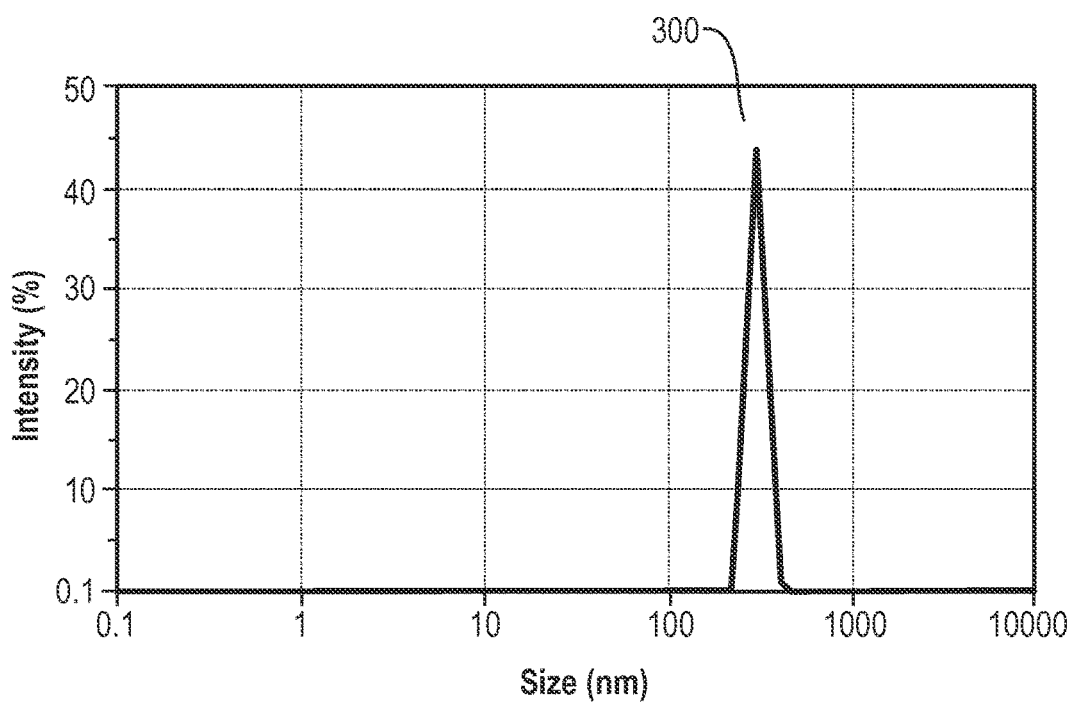
FIGS. 3A and 3B, each on plots of Intensity (in %) and particle size d (in nm), depict the particle size distribution of specific formulations.
Figure 3B:
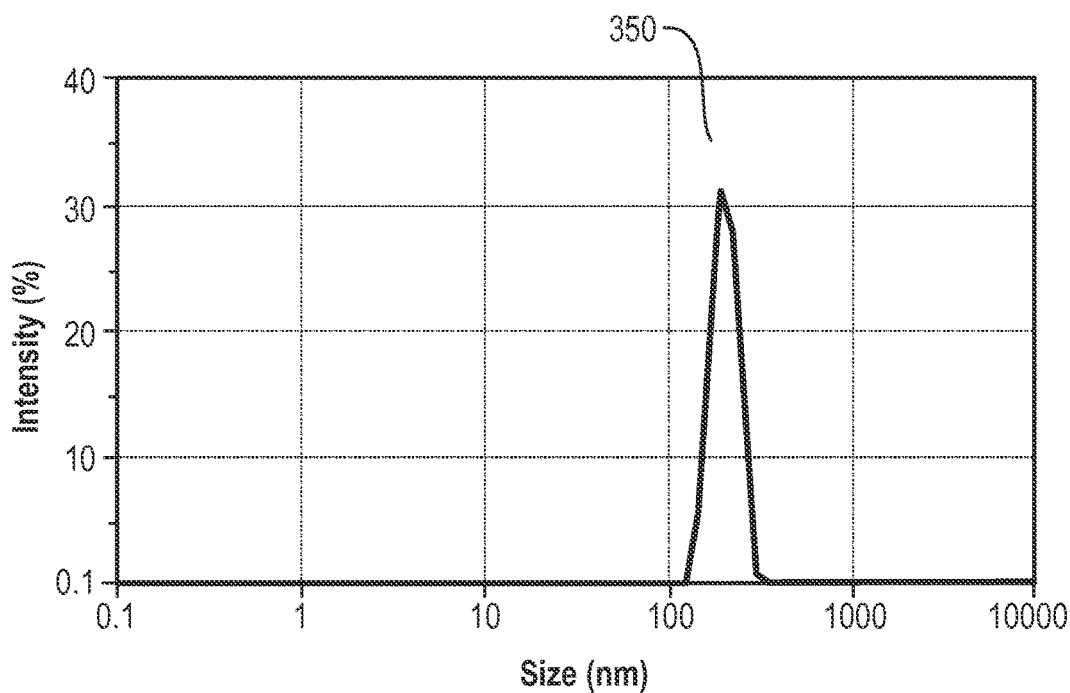

FIGS. 3A-3B also show that both Formulations B and D have a very narrow particle size distribution, which is very different from the pure DDAB system. The pure DDAB aqueous systems typically gave very wide particle size distributions.

The cationic acrylic latex is a stable emulsion (or dispersion) after the reaction and may be used as a fixative without further processing. The particle size of the polymer particles can be measured in the emulsion.

Durability performance was evaluated on both plain paper and HP paper with Colorlok® Technology. A layer of the cationic Formulation D was first applied on the paper, followed by jetting a self-dispersible cyan dispersion (from Cabot Corporation) on the latex layer (with no drying in between). The sample was then briefly dried to allow film formation. Next, the optical density (OD) was measured and the durability was determined. A reference was done without using the cationic latex. The results are shown in Tables II and III.

TABLE II

Tests of the Latex on Paper [a]

| | Plain Paper | | | Colorlok® | | |
|---|---|---|---|---|---|---|
| | | | Condition | | | |
| | no latex | latex wet | latex dry | no latex | latex wet | latex dry |
| OD | * | ** | ** | * | ** | ** |
| durability | * | ** | ** | * | ** | ** |

Note:
[a] These tests were done by visual inspections and simple rubbing test, and more stars means better durability.

TABLE III

OD of the Prints of Cyan Dispersion

| | Plain paper | | | Colorlok | | |
|---|---|---|---|---|---|---|
| | | | condition | | | |
| | no latex | latex wet | latex dry | no latex | latex wet | latex dry |
| OD | 1.01 | 1.07 | 1.06 | 1.06 | 1.10 | 1.09 |

As shown in Tables II and III, the cationic latex fixative based on the teachings herein shows improvement of print durability and OD. It is expected that with optimization of the fixative, the enhancement in durability and OD can be further improved.

Two additional Formulations were prepared, Formulations E and F. Formulation E was an emulsifier-free (also called soap-free) emulsion polymerization. The composition, emulsion stability, and particle size d (in nm) for Formulations E and F are shown in Table IV below. When printed on plain paper and HP paper with Colorlok® Technology, both formulations gave results similar to Formulation D, above.

TABLE IV

Formulations of the Cationic Latex

| Ingredients | Formulations | |
|---|---|---|
| | E | F |
| Monomers: | | |
| Butyl acrylate | 8.94 | 8.94 |
| Styrene | 8.18 | 8.20 |
| 2-(methacryloyloxy)ethyl trimethylammonium chloride | 4.26 | 3.02 |
| [2-(Acryloyloxy)ethyl](4-benzoylbenzyl)-dimethylammonium bromide | 6.23 | 6.36 |
| Emulsifier: | | |
| DDAB | | 0.99 |
| Initiator: | | |
| V-50 | 0.9 | 1.01 |

TABLE IV-continued

Formulations of the Cationic Latex

| | Formulations | |
|---|---|---|
| Ingredients | E | F |
| Media: | | |
| Water | 76.2 | 71.34 |
| Emulsion stability | Excellent | Excellent |
| Particle Size (nm) | 186 | 204 |

The cationic latex fixative disclosed herein appears to have several advantages, including improved optical density (OD) and fastness of un-contented printing ink; tunable particle sizes by varying one of the cationic monomers in the latex formulation; and can be used as a low-cost cationic fixer for inkjet printing applications.

What is claimed is:

1. A cationic latex fixative for ink applications derived from a combination of 1 to 80.1 weight percent of a cationic monomer, 0.9 to 50.5 weight percent of a nonionic monomer that provides softness to the latex, and greater than 0 to 40.5 weight percent of a nonionic monomer that provide stiffness to the latex, the cationic monomer being selected from the group consisting of dimethylaminoethyl acrylate methyl chloride, dimethylaminoethyl methacrylate methyl chloride quaternary salt, acrylamidopropyltrimethylammonium chloride, [2-(acryloyloxy)ethyl](4-benzoylbenzyl)dimethylammonium bromide, methacrylamidopropyltrimethylammonium chloride, diallyldimethylammonium chloride, 2,6-diethyl-4-vinyl pyridine, 3-dodecyl-4-vinyl pyridine, and 2,3,5,6,-tetramethyl-4-vinyl pyridine.

2. The cationic latex fixative of claim 1, wherein the cationic monomer is [2-(acryloyloxy)ethyl](4-benzoylbenzyl)dimethylammonium bromide.

3. The cationic latex fixative of claim 1 wherein the nonionic monomer that provides softness to the latex is selected from the group consisting of n-butyl (meth)acrylate, n-hexyl (meth)acrylate, 2-ethyl hexyl acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate.

4. The cationic latex fixative of claim 1 wherein the nonionic monomer that provides stiffness to the latex is selected from the group consisting of styrene, acrylonitrile, methyl methacrylate, alpha-methyl styrene, vinyl toluene, and vinyl naphthalene.

5. The cationic latex fixative of claim 1, wherein the combination further includes another cationic monomer selected from the group consisting of 2-(methacryloyloxy) ethyl trimethylammonium chloride, dimethylaminoethyl acrylate methyl chloride, dimethylaminoethyl methacrylate methyl chloride quaternary salt, acrylamidopropyltrimethylammonium chloride, [2-(acryloyloxy)ethyl](4-benzoylbenzyl)dimethylammonium bromide, methacrylamidopropyltrimethylammonium chloride, diallyldimethylammonium chloride, 4-vinyl pyridine, 2,6-diethyl-4-vinyl pyridine, 3-dodecyl-4-vinyl pyridine, and 2,3,5,6,-tetramethyl-4-vinyl pyridine.

6. The cationic latex fixative of claim 1, wherein the combination includes:
[2-(acryloyloxy)ethyl](4-benzoylbenzyl)dimethylammonium bromide as the cationic monomer;
butyl acrylate as the nonionic monomer that provides softness to the latex;
styrene as the nonionic monomer that provide stiffness to the latex; and
2-(methacryloyloxy)ethyl trimethylammonium chloride as an other another cationic monomer.

7. A method for manufacturing a cationic latex fixative for ink applications derived from a combination of 1 to 80.1 weight percent of a cationic monomer, 0.9 to 50.5 weight percent of a nonionic monomer that provides softness to the latex, and greater than 0 to 40.5 weight percent of a nonionic monomer that provide stiffness to the latex, the cationic monomer being selected from the group consisting of dimethylaminoethyl acrylate methyl chloride, dimethylaminoethyl methacrylate methyl chloride quaternary salt, acrylamidopropyltrimethylammonium chloride, [2-(acryloyloxy)ethyl](4-benzoylbenzyl)dimethylammonium bromide, methacrylamidopropyltrimethylammonium chloride, diallyldimethylammonium chloride, 2,6-diethyl-4-vinyl pyridine, 3-dodecyl-4-vinyl pyridine, and 2,3,5,6,-tetramethyl-4-vinyl pyridine, the method including:
forming a first mixture including the monomers;
heating the first mixture to an elevated temperature;
forming a second mixture including an initiator;
adding the second mixture to the first mixture to form an admix-ture; and
heating the admixture to an elevated temperature for a period of time.

8. The method of claim 7, wherein the cationic monomer is [2-(acryloyloxy)ethyl](4-benzoylbenzyl)dimethylammonium bromide.

9. The method of claim 7 wherein the nonionic monomer that provides softness to the latex is selected from the group consisting of butyl acrylate, hexyl acrylate, 2-ethyl hexyl acrylate, octyl acrylate, n-decyl (meth)acrylate, n-dodecyl (meth)acrylate, tetradecyl (meth)acrylate, n-amyl (meth)acrylate, neo-pentyl (meth)acrylate, cyclopentyl (meth)acrylate, lauryl (meth)acrylate, oleyl (meth)acrylate, palmityl (meth)acrylate, and stearyl (meth)acrylate.

10. The method of claim 7 wherein the nonionic monomer that provides stiffness to the latex is selected from the group consisting of styrene, acrylonitrile, and methyl methacrylate, alpha-methyl styrene, vinyl toluene, and vinyl naphthalene.

11. The method of claim 7 wherein the first mixture is heated to a temperature of about 60° C., the second mixture is added to the first mixture over a period of time to form the admixture, and the admixture is maintained at a temperature within a range of about 60° to 80° C. for a period of time within a range of about 3 to 10 hours.

12. The method of claim 7 wherein forming the first mixture further includes adding a cationic emulsifier to the monomers, the cationic emulsifier selected from the group consisting of didodecyldimethylammonium bromide (DDAB), dodecyl trimethylammonium bromide (DTAB), dimethyldioctade-cylammonium bromide, dodecyldimethylethylammonium bromide, tetradecyltrimethylammonium bromide, laurylamine oxide, lauryl dimethylamine oxide, and N,N-dimethyldodecylamine-N-oxide.

13. The method of claim 7 wherein the initiator is selected from the group consisting of K2S2O8, 2,2'-azobis(2-methylpropionamidine) dihydrochloride (V-50), 2,2'-azobis(isobutyramidine) dihydrochloride, 2,2'-azobis[2-methyl-N-(2-hydroxyethyl) propionamide], 2,2'-azobis{2-[1-(2-hydroxyethyl)-2-imidazolin-2-yl]propane}dihydrochloride, 2,2'-azobis(1-imino-1-pyrrolidino-2-ethylpropane)dihydrochloride, 2,2'-azobis[2-(2-imidazolin-2-yl)propane]disulfate dihydrate, 2,2'-azobis[2-(2-imidazolin-2-yl)propane]dihydrochloride, and 2,2'-azobis[N-(2-carboxyethyl)-2-methylpropionamide]hydrate.

14. A method for printing an ink, the method comprising:
providing an ink;
providing a cationic latex fixative derived from:
1 to 80.1 weight percent of a cationic monomer, the cationic monomer being selected from the group consisting of dimethylaminoethyl acrylate methyl chloride, dimethylaminoethyl methacrylate methyl chloride quaternary salt, acrylamidopropyltrimethylammonium chloride, [2-(acryloyloxy)ethyl](4-benzoylbenzyl)dimethylammonium bromide, methacrylamidopropyltrimethylammonium chloride, diallyldimethylammonium chloride, 2,6-diethyl-4-vinyl pyridine, 3-dodecyl-4-vinyl pyridine, and 2,3,5,6,-tetramethyl-4-vinyl pyridine,
0.9 to 50.5 weight percent of a nonionic monomer that provides softness to the latex, and
greater than 0 to 40.5 weight percent of a nonionic monomer that provides stiffness to the latex; and
printing the ink and the cationic latex fixative in either order on a print medium.

15. The method of claim 14, wherein the cationic latex fixative is printed first on the print medium, followed by the ink.

16. A cationic latex fixative for ink applications derived from a combination consisting essentially of:

1 to 80.1 weight percent of one or more cationic monomers selected from the group consisting of 2-(methacryloyloxy)ethyl trimethylammonium chloride, dimethylaminoethyl acrylate methyl chloride, dimethylaminoethyl methacrylate methyl chloride quaternary salt, acrylamidopropyltrimethylammonium chloride, [2-(acryloyloxy)ethyl](4-benzoylbenzyl)dimethylammonium bromide, methacrylamidopropyltrimethylammonium chloride, 4-vinyl pyridine, 2,6-diethyl-4-vinyl pyridine, 3-dodecyl-4-vinyl pyridine, and 2,3,5,6,-tetramethyl-4-vinyl pyridine;

0.9 to 50.5 weight percent of one or more nonionic monomers that provides softness to the latex selected from the group consisting of n-butyl (meth)acrylate, n-hexyl (meth)acrylate, 2-ethyl hexyl acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, palmityl (meth)acrylate, and stearyl (meth)acrylate; and greater than 0 to 40.5 weight percent of one or more nonionic monomers that provide stiffness to the latex selected from the group consisting of styrene, acrylonitrile, methyl methacrylate, alpha-methyl styrene, vinyl toluene, and vinyl naphthalene.

\* \* \* \* \*

UNITED STATES PATENT AND TRADEMARK OFFICE
CERTIFICATE OF CORRECTION

PATENT NO. : 10,240,059 B2
APPLICATION NO. : 15/039816
DATED : March 26, 2019
INVENTOR(S) : Yan Zhao et al.

Page 1 of 1

It is certified that error appears in the above-identified patent and that said Letters Patent is hereby corrected as shown below:

Column 8, Line 6, Claim 6, after "as" delete "an other".

Column 8, Line 27, Claim 7, delete "admix-ture;" and insert -- admixture; --, therefor.

Column 8, Line 61, Claim 13, delete "K2S2O8," and insert -- $K_2S_2O_8$, --, therefor.

Signed and Sealed this
Thirtieth Day of July, 2019

Andrei Iancu
*Director of the United States Patent and Trademark Office*